No. 836,707. PATENTED NOV. 27, 1906.
E. RICHTER.
SPEEDER.
APPLICATION FILED APR. 27, 1906.

2 SHEETS—SHEET 1.

Witnesses:
Elmer R. Shipley.
M. S. Belden.

Ernst Richter
Inventor
by James W. See
Attorney

No. 836,707. PATENTED NOV. 27, 1906.
E. RICHTER.
SPEEDER.
APPLICATION FILED APR. 27, 1906.

2 SHEETS—SHEET 2.

Witnesses:
Elmer R. Shipley.
M. S. Belden

Ernst Richter
Inventor
by James W. See
Attorney

UNITED STATES PATENT OFFICE.

ERNST RICHTER, OF CINCINNATI, OHIO, ASSIGNOR TO THE G. A. GRAY COMPANY, OF CINCINNATI, OHIO.

SPEEDER.

No. 836,797.

Specification of Letters Patent.

Patented Nov. 27, 1906.

Application filed April 27, 1906. Serial No. 313,966.

*To all whom it may concern:*

Be it known that I, ERNST RICHTER, a citizen of the United States, residing at Cincinnati, Hamilton county, Ohio, have invented certain new and useful Improvements in Speeders, of which the following is a specification.

This invention, pertaining to improvements in speeders of the stepped-pulley type, will be readily understood from the following description, taken in connection with the accompanying drawings, in which—

Figure 1:
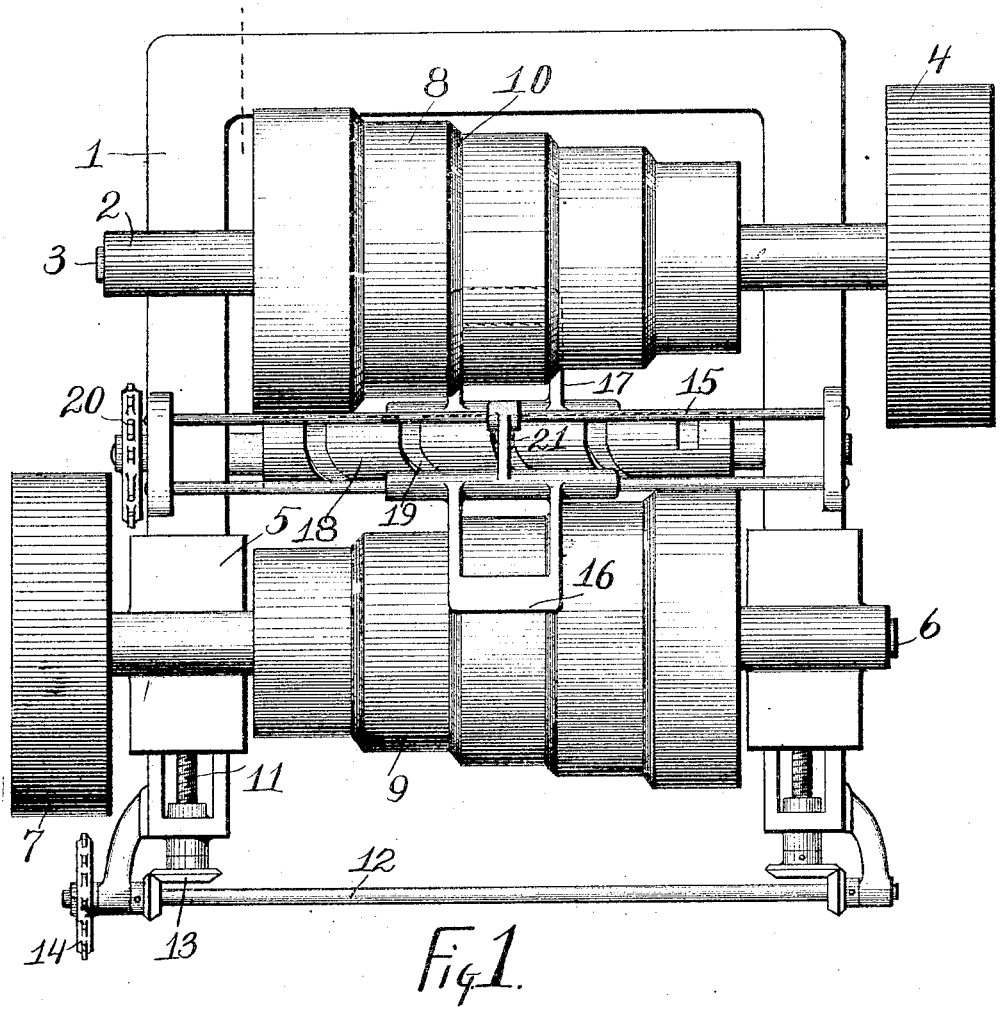
Figure 2:
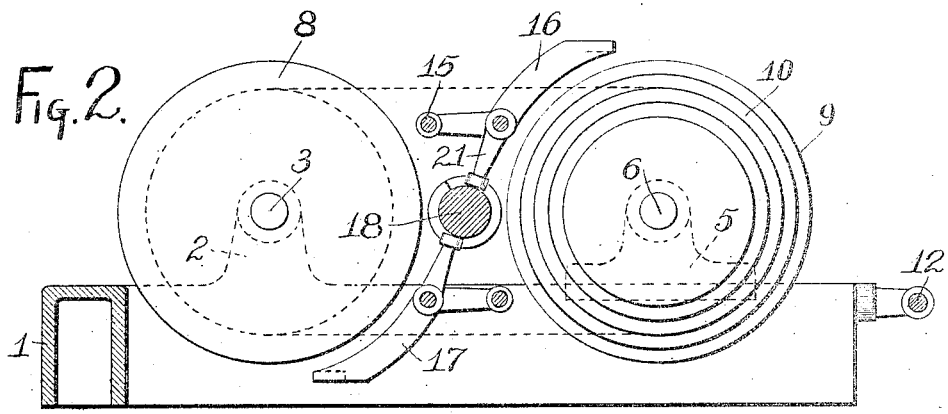
Figure 3:
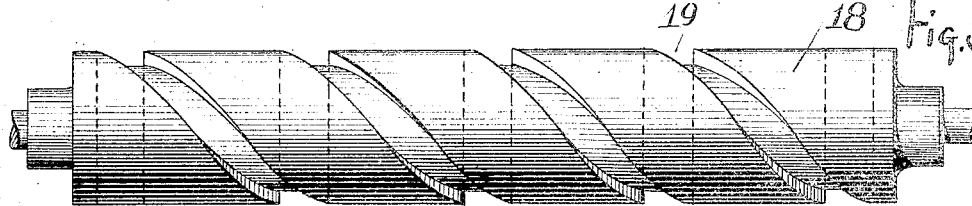
Figure 4:
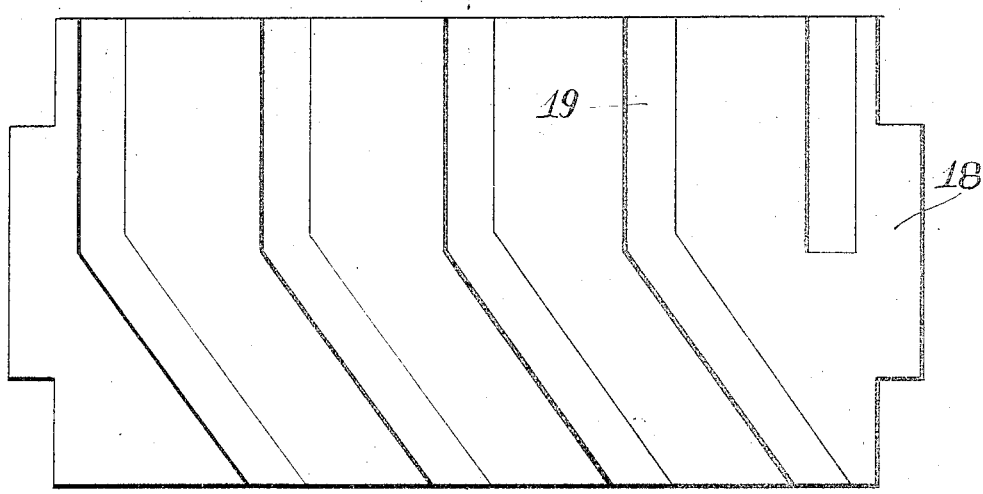

Figure 1 is a plan of a speeder exemplifying my invention; Fig. 2, a vertical section thereof; Fig. 3, an elevation of the shifting-cam, and Fig. 4 a diagram of the cam.

In the drawings, 1 indicates a housing; 2, fixed bearings thereon; 3, a shaft journaled in these bearings; 4, a pulley on the shaft; 5, bearings sliding on the housing to and from the bearings 2; 6, a shaft journaled in the sliding bearings; 7, a pulley on this shaft; 8, a stepped pulley on shaft 3; 9, a reversely-stepped pulley on shaft 6; 10, beveled shoulders between the pulley-steps; 11, screws for adjusting the sliding bearings; 12, an adjusting-shaft; 13, gearing connecting the adjusting-shaft with the screws; 14, a chain-wheel on the adjusting-shaft, serving to illustrate typical means for turning the adjusting-shaft; 15, guide-rods fixed parallel with the axes of the shafts and disposed between the two stepped pulleys, one pair of the guide-rods being disposed to one side and another pair to the other side of the common plane of the axes of the stepped pulleys; 16, a belt-shifter sliding on one pair of guide-rods and coöperating with stepped pulley 9; 17, a belt-shifter sliding on the other pair of guide-rods and coöperating with the other stepped pulley, one of these belt-shifters operating along one side of its stepped pulley, while the other belt-shifter operates along the opposite side of the other stepped pulley; 18, a cylindrical cam mounted for rotation between the two stepped pulleys and between the two pairs of guide-rods; 19, a groove, partly circumferential and partly helical, in the periphery of the cam; 20, a chain-wheel on the cam, serving to illustrate typical means by which the cam may be turned, and 21 arms projecting rigidly from the belt-shifters and armed at their ends, preferably, with rollers engaging the groove of the cam.

Assume a belt engaging appropriate steps of the two stepped pulleys and passing through the belt-shifters and under proper tightness for good working: When speed is to be changed, then by obvious manipulation the sliding boxes are adjusted inwardly, thus slackening the belt. The cam is then turned in proper direction, and the first effect is to advance the proper belt-shifter toward the next smaller step of its stepped pulley, thus shifting the belt onto the smaller step. The next effect of the turning of the cam is to shift the belt upon the other stepped pulley onto the next and larger step, the belt being thus brought into line upon two new steps. The sliding boxes are then to be moved outwardly, thus retightening the belt.

The device permits of peculiar facility for the changing of speeds in situations even where belts are very wide and heavy, and it well lends itself to compactness by reason of the extremely short distance permissible between shaft centers, it being only requisite to provide room for the cam. As between the shafts of the two stepped pulleys either may be the driving or the driven shaft.

I claim—

1. A speeder comprising a housing, a shaft journaled therein, a pair of bearings arranged to slide to and from the shaft, a shaft journaled in the sliding bearings, means for adjusting the sliding bearings, reversely-stepped pulleys on the two shafts, the shoulders at the step junctures being beveled, an independent belt-shifter arranged to traverse each stepped pulley, guides for the belt-shifters, a rotatable cylindrical cam having a groove partly circumferential and partly helical, and parts projecting from the belt-shifters into engagement with the groove of the cam.

2. A speeder comprising a housing, a shaft journaled therein, a pair of bearings arranged to slide to and from the shaft, a shaft journaled in the sliding bearings, screws engaging the sliding bearings, an adjusting-shaft geared to the screws, reversely-stepped pulleys on the two shafts, the shoulders at the step junctures being beveled, an independent belt-shifter arranged to traverse each stepped pulley, guides for the belt-shifters, a rotatable cylindrical cam having a groove partly circumferential and partly helical, and parts projecting from the belt-shifters into engagement with the groove of the cam.

3. A speeder comprising a housing, a shaft journaled therein, a pair of bearings arranged to slide to and from the shaft, a shaft journaled in the sliding bearings, means for adjusting the sliding bearings, reversely-stepped pulleys on the two shafts, the shoulders at the step junctures being beveled, an independent belt-shifter arranged to traverse each stepped pulley, guides for the belt-shifters, a rotatable cylindrical cam disposed between the two stepped pulleys and having a groove partly circumferential and partly helical, and parts projecting from the belt-shifters into engagement with the groove of the cam.

4. A speeder comprising a housing, a shaft journaled therein, a pair of bearings arranged to slide to and from the shaft, a shaft journaled in the sliding bearings, means for adjusting the sliding bearings, reversely-stepped pulleys on the two shafts, the shoulders at the step junctures being beveled, an independent belt-shifter arranged to traverse each stepped pulley, two pairs of rods supported by the housing and serving as guides for the belt-shifters, a rotatable cylindrical cam having a groove partly circumferential and partly helical, and parts projecting from the belt-shifters into engagement with the groove of the cam.

ERNST RICHTER.

Witnesses:
HENRY MARX,
ADOLPH ZURST.